(12) United States Patent
Kao et al.

(10) Patent No.: US 6,299,186 B1
(45) Date of Patent: Oct. 9, 2001

(54) ANTISHOCK STRUCTURE OF SCOOTER

(76) Inventors: Chuan-Fu Kao; Yun-Chuan Chang, both of P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/560,180

(22) Filed: Apr. 28, 2000

(51) Int. Cl.[7] ................................................. A63C 17/00
(52) U.S. Cl. ................................ 280/87.041; 280/11.28
(58) Field of Search ........................... 280/87.01, 87.021, 280/87.041, 87.042, 87.05, 842, 11.28; 301/5.3, 5.7

(56) References Cited

U.S. PATENT DOCUMENTS

| | | | | |
|---|---|---|---|---|
| 4,054,297 | * | 10/1977 | Solimine | 280/87.042 |
| 4,152,001 | * | 5/1979 | Christianson | 280/11.28 |
| 4,185,847 | * | 1/1980 | Johnson | 280/87.042 |
| 4,403,784 | * | 9/1983 | Gray | 280/11.28 |
| 4,775,162 | * | 10/1988 | Chao | 280/87.041 |
| 4,776,604 | * | 10/1988 | Valdez et al. | 280/87.041 |
| 5,048,632 | * | 9/1991 | Battel | 280/87.042 |
| 5,263,725 | * | 11/1993 | Gesmer et al. | 280/87.042 |
| 5,551,713 | * | 9/1996 | Alexander | 280/11.28 |
| 5,924,710 | * | 7/1999 | De Courcey Milne | 280/87.042 |
| 5,997,018 | * | 12/1999 | Lee | 280/87.042 |
| 6,224,076 | * | 5/2001 | Kent | 280/87.042 |

FOREIGN PATENT DOCUMENTS

| | | | | |
|---|---|---|---|---|
| 446984 | * | 3/1968 | (CH) | 280/87.042 |
| 2006027 | * | 5/1979 | (GB) | 280/11.28 |

* cited by examiner

*Primary Examiner*—Frank Vanaman
(74) *Attorney, Agent, or Firm*—Dougherty & Troxell

(57) ABSTRACT

An antishock structure of scooter featuring a U-shaped anchor plate having symmetrical anchor holes disposed on top and bottom of its front and back surfaces; after the lower anchor holes are connected to wheel axles respectively, the other end of wheel axles is jointed with a front wheel respectively. A lug is arranged at the upper margin of the end of each wheel axle that enables the ends of two antishock members to be connected to the upper anchor hole of said anchor plate and the lug of said wheel axle respectively. As such, when the scooter is moving, the two antishock members provide a cushioning effect.

1 Claim, 3 Drawing Sheets

ANTISHOCK STRUCTURE OF SCOOTER

BACKGROUND OF THE INVENTION

1. Field of the Invention

The invention herein relates to an antishock structure of scooter, particularly a kind that achieves cushioning effect when the scooter is sliding to render the moving of scooter smoother and more stable.

2. Description of the Related Art

Regular scooter usually has a front wheel, a rear wheel, and a long bar handle installed on top of the footboard for user to hold onto and slide. Given that conventional scooters are not equipped with any shock absorbing device, they tend to wobble or even go slanted when it travels on uneven surface that causes the user to lose balance and takes away the fun of the game. This kind of shortcoming has long been the object of complaint by merchants and consumers alike. Thus there is a need to provide an antishock structure for scooter to improve its handling and enhances its value.

SUMMARY OF THE INVENTION

The objective of the invention herein is to provide an antishock structure of scooter having an anchor plate mounted in front of the footboard, a wheel axle jointed with said anchor plate and provided for the mounting of front wheels, a lug at each end of wheel axle for the hookup of two antishock members, while the other end of said antishock members is jointed with the anchor plate respectively. The cushioning effect provided by the antishock members keeps the scooter stable when it travels on uneven surface, thus enhancing the fun of scooter riding.

BRIEF DESCRIPTION OF THE DRAWINGS

The features and novelty of the invention herein will become apparent in the following detailed description of the preferred embodiments, with reference to the accompanying drawings below.

DETAILED DESCRIPTION OF THE PREFERRED EMBODIMENT

Figure 1:
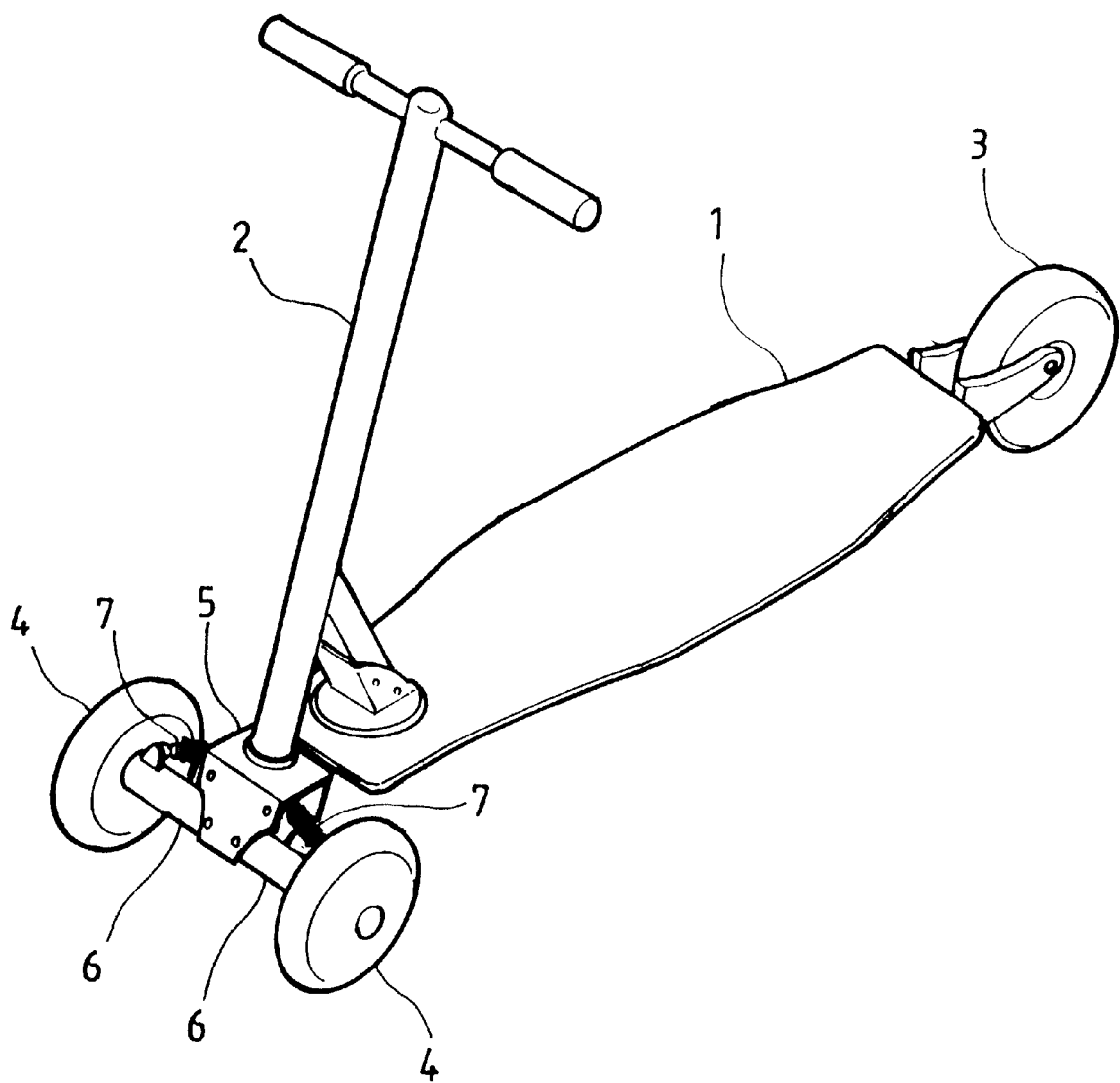
FIG. 1 is a three-dimensional drawing of the preferred embodiment of the invention herein.
Figure 2:
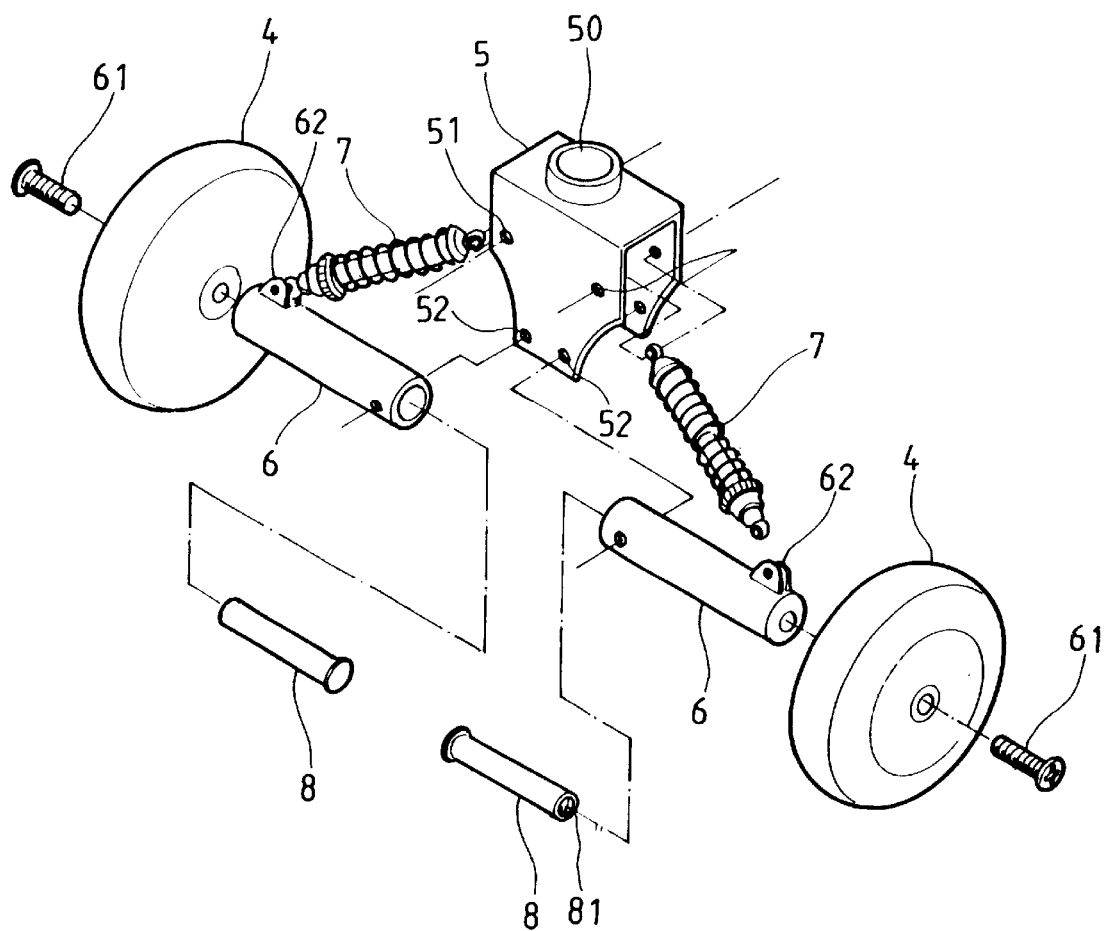
FIG. 2 is a three-dimensional exploded view of the preferred embodiment of the invention herein.

Referring to FIG. 1 and FIG. 2, the preferred embodiment of the invention herein consists of a footboard 1, bar handle 2, front wheel 4, and rear wheel 3 as seen in scooter of prior art, wherein an inverted U-shaped anchor plate is installed in front of footboard which has a sleeve 50 at its top edge for connection with bar handle 2 and symmetrical anchor holes 51, 52 at the top and bottom of its front and back surfaces. After the lower anchor holes 52 are jointed with the hollow wheel axle 6, the other end of wheel axle 6 is fastened to front wheel 4 with screw 61. A lug 62 is disposed on the upper edge of wheel axles 6 at the end connecting to front wheel 4 respectively. The ends of two antishock members 7 are connected to the upper anchor hole 51 of anchor plate 5 and lug 62 respectively. The antishock members provide cushioning effect to keep the scooter steady when it travels on uneven surfaces.

Figure 3:
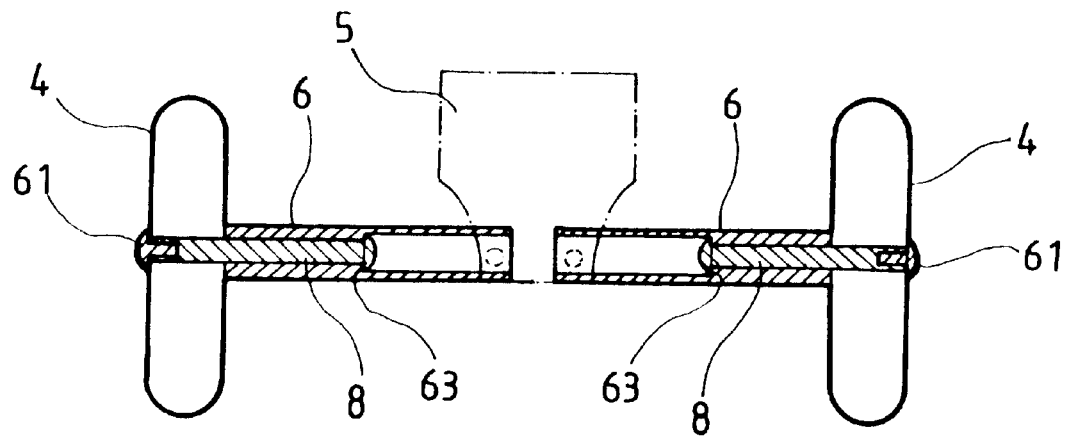
FIG. 3 is a cross-sectional drawing of the preferred embodiment of the invention herein.

Referring to FIG. 2 and FIG. 3, wheel axles 6 are hollow having a step 63 in the hollow body. During assembly, a bolt 8 having a screw hole 81 at one end passes through wheel axle 6 and stops at step 63 with its end disposed through front wheel 4. Then screw 61 is fastened into screw hole 81 of bolt 8 to secure front wheel 4.

Figure 4:
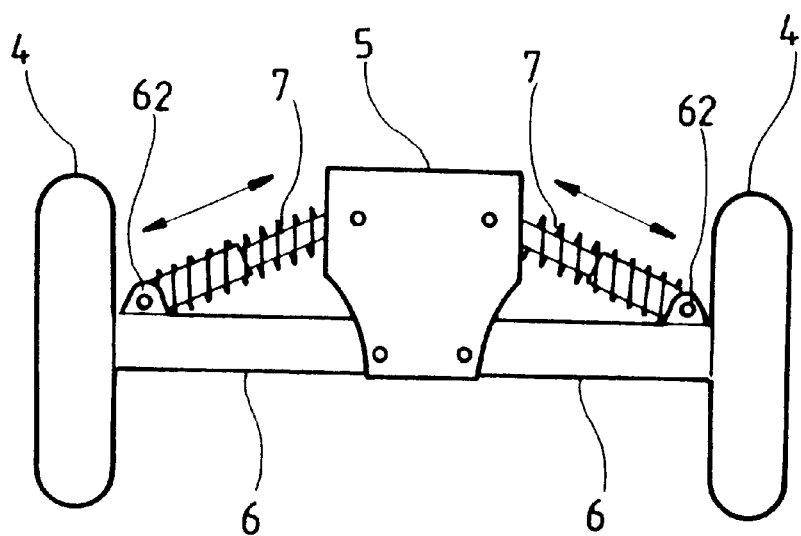
FIG. 4 is a diagram of the preferred embodiment of the invention herein in action.

Referring to FIG. 4, when the invention herein is in use, front wheel 4 vibrates up and down if the road surface is uneven. The two antishock members can cushion the vibration of front wheel 4 so the scooter can slide forward more smoothly and steadily to prevent user from falling down.

As described above, the arrangement of an anchor plate in front of footboard for the connection of front wheel and antishock members render the movement of the scooter smoother. It is a practical and innovative design.

What is claimed is:

1. A scooter having an antishock wheel mounting, the scooter comprising:

a) a footboard having front and rear portions, with at least one rear wheel mounted to the rear portion;

b) an anchor plate having an inverted U-shaped cross-sectional configuration and a sleeve extending from a top edge;

c) a bar handle connected to the front portion of the footboard and to the sleeve of the anchor plate;

d) first and second hollow wheel axles, each axle having a first end attached to the anchor plate and a second end, each axle further having a stepped bore extending therethrough;

e) an axle bolt having an enlarged head located in the stepped bore of each wheel axle such that the enlarged head bears against a step of the stepped bore and a shank end extends outwardly from the second end of the each wheel axle;

f) a wheel mounted on each shank end; and, g) first and second antishock members, each having a first end attached to the anchor plate at a location spaced from the first ends of the wheel axles, and a second end attached to the second end of the associated wheel axle, such that the antishock members extend at an acute angle with respect to the associated wheel axle.

* * * * *